United States Patent
Kong et al.

(10) Patent No.: US 11,446,901 B2
(45) Date of Patent: Sep. 20, 2022

(54) HOT-STAMPED PART AND MANUFACTURING METHOD THEREFOR

(71) Applicant: Hyundai Steel Company, Incheon (KR)

(72) Inventors: Je Youl Kong, Incheon (KR); Ji Young Kim, Incheon (KR); Young Chul Park, Incheon (KR); Hye Jin Kim, Incheon (KR); Byung Gil Yoo, Incheon (KR); Wan Yook, Incheon (KR); Seung Chae Yoon, Incheon (KR); Gi Hak Yim, Incheon (KR); Jeong Hwan Jang, Incheon (KR)

(73) Assignee: Hyundai Steel Company, Incheon (KR)

( * ) Notice: Subject to any disclaimer, the term of this patent is extended or adjusted under 35 U.S.C. 154(b) by 0 days.

(21) Appl. No.: 17/437,135

(22) PCT Filed: Dec. 26, 2019

(86) PCT No.: PCT/KR2019/018501
§ 371 (c)(1),
(2) Date: Sep. 8, 2021

(87) PCT Pub. No.: WO2020/222394
PCT Pub. Date: Nov. 5, 2020

(65) Prior Publication Data
US 2022/0168996 A1    Jun. 2, 2022

(30) Foreign Application Priority Data

Apr. 30, 2019   (KR) .................. 10-2019-0050165

(51) Int. Cl.
*C21D 6/00*     (2006.01)
*C21D 9/46*     (2006.01)
(Continued)

(52) U.S. Cl.
CPC .......... *B32B 15/012* (2013.01); *B21D 22/022* (2013.01); *C21D 6/004* (2013.01);
(Continued)

(58) Field of Classification Search
None
See application file for complete search history.

(56) References Cited

U.S. PATENT DOCUMENTS

2011/0214475 A1* 9/2011 Spehner .................. C22C 38/32
                                                                   72/364

FOREIGN PATENT DOCUMENTS

JP    2010-150612 A    7/2010
KR    10-1508861 B1    4/2015
(Continued)

OTHER PUBLICATIONS

Decision to Grant Patent and the English translations Korean Application No. 10-2019-0050165.
(Continued)

*Primary Examiner* — Anthony M Liang
(74) *Attorney, Agent, or Firm* — Fox Rothschild LLP (57) ABSTRACT

A hot-stamped part according to an embodiment of the present invention comprises, as a base layer, a steel comprising: 0.28-0.38 wt % of carbon (C); 0.1-0.4 wt % of silicon (Si); 1.2-2.0 wt % of manganese (Mn); from greater than 0 to 0.020 wt % of phosphorus (P); from greater than 0 to 0.003 wt % of sulfur (S); 0.1-0.5 wt % of chromium (Cr); 0.0015-0.0040 wt % of boron (B); 0.025-0.05 wt % of titanium (Ti); and the remainder of iron (Fe) and inevitable impurities, wherein the microstructure of the base layer is full martensite.

5 Claims, 8 Drawing Sheets

(51) Int. Cl.
  *C22C 38/00* (2006.01)
  *C22C 38/02* (2006.01)
  *C22C 38/04* (2006.01)
  *B32B 15/01* (2006.01)
  *C22C 38/54* (2006.01)
  *C22C 38/50* (2006.01)
  *C22C 38/48* (2006.01)
  *C22C 38/44* (2006.01)
  *B21D 22/02* (2006.01)
  *C21D 7/13* (2006.01)

(52) U.S. Cl.
  CPC ............ *C21D 6/005* (2013.01); *C21D 6/008* (2013.01); *C21D 9/46* (2013.01); *C22C 38/002* (2013.01); *C22C 38/02* (2013.01); *C22C 38/04* (2013.01); *C22C 38/44* (2013.01); *C22C 38/48* (2013.01); *C22C 38/50* (2013.01); *C22C 38/54* (2013.01); *C21D 7/13* (2013.01)

(56) References Cited

FOREIGN PATENT DOCUMENTS

| | | |
|---|---|---|
| KR | 101508861 B1 | 4/2015 |
| KR | 2018-0011004 A | 1/2018 |
| KR | 2018-0095757 A | 8/2018 |
| KR | 2019-0001493 A | 1/2019 |
| KR | 101938092 B1 | 4/2019 |
| KR | 10-2213974 B1 | 2/2021 |

OTHER PUBLICATIONS

First Office Action and the English translations of Korean Application No. 10-2019-0050165.

* cited by examiner

HOT-STAMPED PART AND MANUFACTURING METHOD THEREFOR

CROSS-REFERENCE TO RELATED APPLICATIONS

This application is a National Phase application filed under 35 USC 371 of PCT International Application No. PCT/KR2019/018501 with an International Filing Date of Dec. 26, 2019, which claims the benefit of Korean Patent Application No. 10-2019-0050165 filed on Apr. 30, 2019. The entire contents of these applications are incorporated herein by reference in their entirety.

TECHNICAL FIELD

The present invention relates to a hot-stamped part and a method for manufacturing the same, and more particularly, to a hot-stamped part having excellent weldability, high delayed fracture resistance and high tensile strength, and a method for manufacturing the same.

BACKGROUND

In the current automobile industry, environmental and fuel economy regulations and safety standards have become more stringent. Accordingly, the application rate of ultra-high strength steel and hot-stamped steel has steadily increased. In particular, in the case of hot-stamped steel, including conventional 1.5 G hot-stamped steel, research and development has been conducted to increase toughness and strength. A hot stamping process generally includes heating, molding, cooling and trimming, and phase transformation and microstructural change of material are used during the process.

Technologies related thereto include Korean Patent Application Publication No. 10-2018-0095757 (entitled "Method for Manufacturing Hot-Stamped Parts").

SUMMARY OF THE INVENTION

Technical Problem

An object of the present invention is to provide a hot-stamped part having excellent weldability, high delayed fracture resistance and high tensile strength, and a method for manufacturing the same.

Technical Solution

A hot-stamped part according to an exemplary embodiment of the present invention for achieving the above object includes, as a base layer, a steel material having a composition including an amount of 0.28 to 0.38 wt % of carbon (C), an amount of 0.1 to 0.4 wt % of silicon (Si), an amount of 1.2 to 2.0 wt % of manganese (Mn), an amount of greater than 0 but not greater than 0.020 wt % of phosphorus (P), an amount greater than 0 but not greater than 0.003 wt % of sulfur (S), an amount of 0.1 to 0.5 wt % of chromium (Cr), an amount of 0.0015 to 0.0040 wt % of boron (B), an amount of 0.025 to 0.05 wt % of titanium (Ti), and the balance of iron (Fe) and unavoidable impurities, all the wt % based on the total weight of the composition, and the microstructure of the base layer is full martensite.

The hot-stamped part may further include an Al—Si-based coating layer on the base layer, in which the fraction of a Fe—Al—Si-based intermetallic compound layer in the coating layer may be less than 40%.

In the hot-stamped part, the steel material may have a tensile strength (TS) of 1,700 MPa or greater, a yield strength (YS) of 1,200 MPa or greater, and an elongation (El) of 6% or greater.

A method for manufacturing a hot-stamped part according to an exemplary embodiment of the present invention for achieving the above object includes steps of: (a) preparing a blank including an amount of 0.28 to 0.38 wt % of carbon (C), an amount of 0.1 to 0.4 wt % of silicon (Si), an amount of 1.2 to 2.0 wt % of manganese (Mn), an amount greater than 0 but not greater than 0.020 wt % of phosphorus (P), an amount greater than 0 but not greater than 0.003 wt % of sulfur (S), an amount of 0.1 to 0.5 wt % of chromium (Cr), an amount of 0.0015 to 0.0040 wt % of boron (B), an amount of 0.025 to 0.05 wt % of titanium (Ti), and the balance of iron (Fe) and unavoidable impurities, all the wt % based on the total weight of the blank; (b) heating the blank; (c) forming a molded body by hot-stamping the heated blank in a press mold; and (d) forming a hot-stamped part by cooling the molded body.

In the method for manufacturing a hot-stamped part, step (b) may include: when the thickness of the blank is 1.2 mm, heating the blank in a preheated furnace for a time and at a temperature defined by the diagram having heating time-temperature coordinates of I (175 sec, 880° C.), II (210 sec, 820° C.), III (745 sec, 820° C.) and IV (455 sec, 880° C.) as apexes; when the thickness of the blank decreases by 0.1 mm from 1.2 mm, heating the blank for a time that is decreased by 12 sec from the time defined by the diagram and when the thickness of the blank increases by 0.1 mm from 1.2 mm, heating the blank for a time that is increased by 12 sec from the time defined by the diagram I-II-III-IV.

In the method for manufacturing a hot-stamped part, a heating condition for heating the blank may be set to $6.0 \times 10^{5}$ ° C.·sec/mm or less per thickness of the blank.

In the method for manufacturing a hot-stamped part, the cooling of the molded body in step (d) may be performed at a rate of at least 10° C./sec.

Advantageous Effects

According to the embodiments of the present invention, there may be provided a hot-stamped part having excellent weldability, high delayed fracture resistance and high tensile strength, and a method for manufacturing the same. It is to be understood that the scope of the present invention is not limited by this effect.

DETAILED DESCRIPTION

Hereinafter, a method for manufacturing a steel material for a line pipe according to an embodiment of the present invention will be described in detail. The terms used herein are terms appropriately selected in consideration of the functions in the present invention. Accordingly, the definition of the terms should be made based on the contents throughout the present specification.

Steel Material

One aspect of the present invention is directed to a hot-stamped part which is a steel material obtained through a hot stamping process. In an exemplary embodiment, a hot-stamped part according to one aspect of the present invention includes an amount of 0.28 to 0.38 wt % of carbon (C), an amount of 0.1 to 0.4 wt % of silicon (Si), an amount of 1.2 to 2.0 wt % of manganese (Mn), an amount greater than 0 but not greater than 0.020 wt % of phosphorus (P), an amount greater than 0 but not greater than 0.003 wt % of sulfur (S), an amount of 0.1 to 0.5 wt % of chromium (Cr), an amount of 0.0015 to 0.0040 wt % of boron (B), an amount of 0.025 to 0.05 wt % of titanium (Ti), and the balance of iron (Fe) and unavoidable impurities, all the wt % based on the total weight of the hot-stamped part.

The function and content of each component included in the steel material according to the present invention will now be described.

Carbon (C)

Carbon (C) is a main element that determines the strength and hardness of the steel material, and is added for the purpose of ensuring the tensile strength of the steel material after a hot stamping (or hot press) process. In an exemplary embodiment, carbon (C) is preferably added in an amount of 0.28 to 0.38 wt % based on the total weight of the steel material. When carbon (C) is added in an amount of less than 0.28 wt %, it may be difficult to achieve the mechanical strength of the present invention, and when carbon (C) is added in an amount of greater than 0.38 wt %, the toughness of the steel material may be reduced, and it may be difficult to control the brittleness of the steel material.

Silicon (Si)

Silicon (Si) is added for the purpose of ensuring a soft low-temperature phase during heat treatment. Silicon (Si) is preferably added in an amount of 0.1 to 0.4 wt % based on the total weight of the steel material of the present invention. When silicon (Si) is added in an amount of less than 0.1 wt %, it may be difficult to ensure the soft low-temperature phase during heat treatment, and when silicon (Si) is added in an amount of greater than 0.4 wt %, a problem may arise in that the coating property of the steel material deteriorates.

Manganese (Mn)

Manganese (Mn) is added for the purpose of increasing the hardenability and strength during heat treatment. Manganese (Mn) is preferably added in an amount of 1.2 to 2.0 wt % based on the total weight of the steel material according to the present invention. When manganese (Mn) is added in an amount of less than 1.2 wt %, the grain refining effect thereof may be insufficient. On the other hand, when manganese (Mn) is added in an amount of greater than 2.0 wt %, problems may arise in that the toughness of the steel material deteriorates due to the occurrence of central manganese segregation and there is a disadvantage in terms of cost.

Phosphorus (P)

Phosphorus (P) is an element that tends to segregate and impairs the toughness of steel. Phosphorus (P) is preferably added in an amount greater than 0 wt % but not greater than 0.020 wt % based on the total weight of the steel material of the present invention. When phosphorus is added in an amount within the above range, it is possible to prevent deterioration in toughness of the steel material. When phosphorus is added in an amount of greater than 0.020 wt %, the martensite grain boundary may be broken, cracking may occur during the process, and iron phosphide compounds may be formed, resulting in deterioration in toughness of the steel material.

Sulfur (S)

Sulfur (S) is an element that impairs workability and physical properties. Sulfur (S) is preferably added in an amount greater than 0 wt % but not greater than 0.003 wt % based on the total weight of the steel material according to the present invention. When sulfur is added in an amount of greater than 0.003 wt %, the martensite grain boundary may be broken, hot workability may be degraded, and surface defects such as cracks may occur due to the formation of macro-inclusions.

Chromium (Cr)

Chromium (Cr) is added for the purpose of improving the hardenability and strength of the steel material. Chromium (Cr) is preferably added in an amount of 0.1 to 0.5 wt % based on the total weight of the steel material according to the present invention. When chromium (Cr) is added in an amount of less than 0.1 wt %, the effect of improving hardenability and strength may be insufficient. On the other hand, when chromium (Cr) is added in an amount of greater than 0.5 wt %, a problem may arise in that the toughness of the steel material deteriorates.

Boron (B)

Boron (B) is added for the purpose of ensuring soft martensite hardenability and refining grains. Boron (B) is preferably added in an amount of 0.0015 to 0.0040 wt % based on the total weight of the steel material according to the present invention. When boron (B) is added in an amount of less than 0.0015 wt %, the effect of improving hardenability may be insufficient. On the other hand, when boron (B) is added in an amount of greater than 0.0040 wt %, a problem may arise in that the risk of brittleness and the risk of degrading elongation increase.

Titanium (Ti)

Titanium (Ti) is added for the purpose of enhancing hardenability and improving material properties by precipitate formation after hot-stamping heat treatment, and is added for the purpose of increasing strength and toughness by reducing the martensite packet size. Titanium (Ti) is preferably added in an amount of 0.025 to 0.05 wt % based on the total weight of the steel material according to the present invention. When titanium (Ti) is added in an amount of less than 0.025 wt %, precipitate formation may be insignificant, and the effect of refining grains may be insufficient. On the other hand, when titanium (Ti) is added in an amount of greater than 0.05 wt %, the risk of degrading elongation may increase, and the toughness of the steel material may deteriorate.

The hot-stamped part includes, as a base layer, the steel material having the above-described composition, and the microstructure of the base layer is composed of full martensite. The steel material in the hot-stamped part may have a tensile strength (TS) of 1,700 MPa or greater, a yield strength (YS) of 1,200 MPa or greater, and an elongation (El) of 6% or greater. The hot-stamped part may further include an Al—Si-based coating layer on the base layer, in which the fraction of a Fe—Al—Si-based intermetallic compound layer in the coating layer may be less than 40%.

Hereinafter, a method of manufacturing a hot-stamped part using the above-described steel material of the present invention will be described in detail.

Method for Manufacturing Hot-Stamped Part

Another aspect of the present invention is directed to a method of manufacturing a hot-stamped part using the steel material having the above-described composition.

Figure 1:
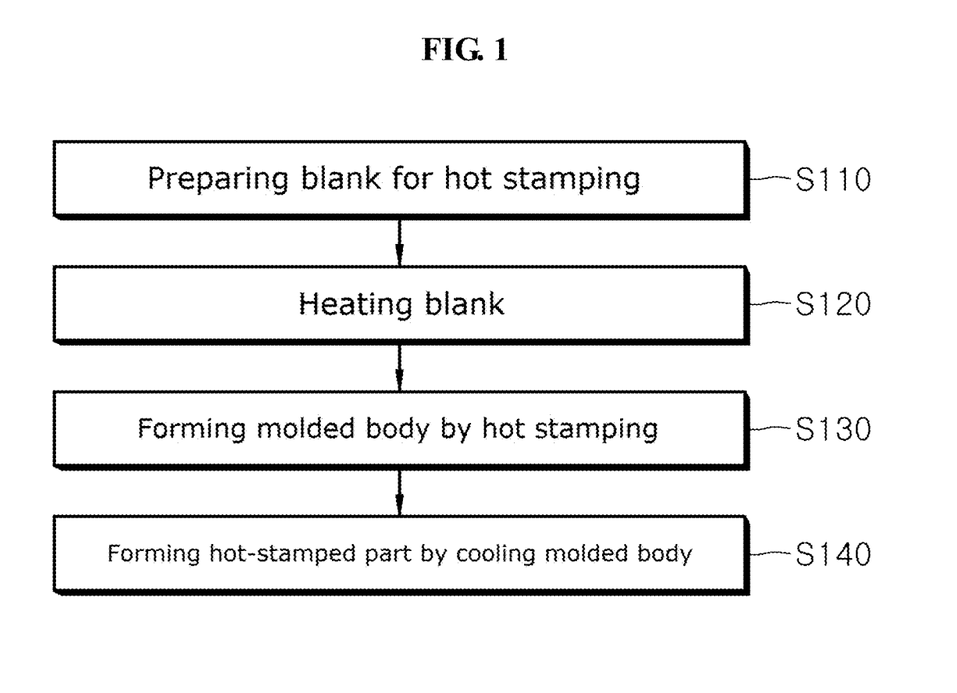
FIG. 1 is a process flow chart illustrating a method for manufacturing a hot-stamped part according to an exemplary embodiment of the present invention.
Figure 2:
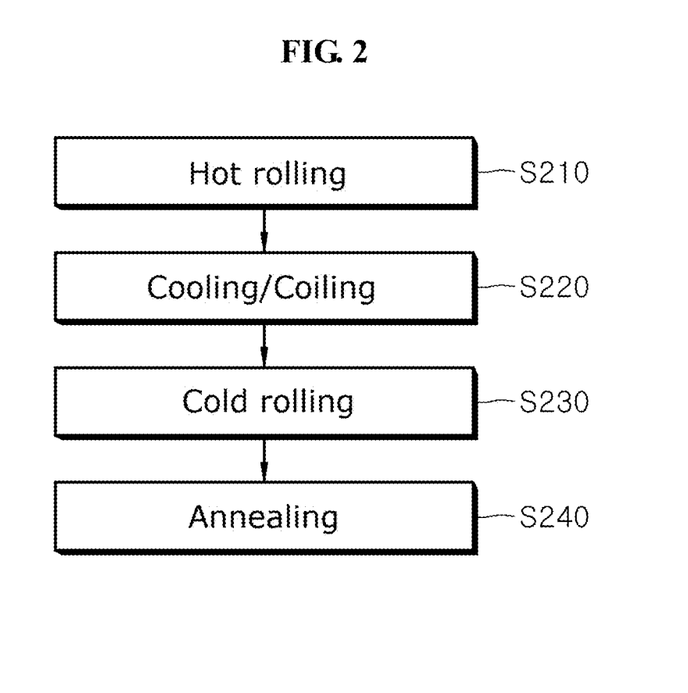
FIG. 2 is a process flow chart illustrating a step of preparing a blank for hot stamping in the method for manufacturing a hot-stamped part according to an exemplary embodiment of the present invention shown in FIG. 1.

FIG. 1 is a process flow chart illustrating a method for manufacturing a hot-stamped part according to an embodiment of the present invention, and FIG. 2 is a process flow chart illustrating a step of preparing a blank for hot stamping in the method for manufacturing a hot-stamped part according to the embodiment of the present invention shown in FIG. 1.

Referring to FIG. 1, a method for manufacturing a hot-stamped part according to an embodiment of the present invention includes steps of: (a) preparing a blank for hot stamping as a steel material having the above-described composition (S110); (b) heating the blank (S120); (c) forming a molded body by hot-stamping the heated blank in a press mold (S130); and (d) forming a hot-stamped part by cooling the molded body (S140).

Step (S110) of Preparing Blank for Hot Stamping

Step (S110) of preparing the blank for hot stamping is a step of forming the blank by cutting a sheet for forming the hot-stamped part into a desired shape according to the intended use.

As shown in FIG. 2, the process of forming the blank may include a hot-rolling step (S210), a cooling/coiling step (S220), a cold-rolling step (S230), and an annealing step (S240).

In the method for manufacturing the hot-stamped part according to the present invention, a semi-finished slab sheet, which is to be subjected to the process of forming the blank, includes an amount of 0.28 to 0.38 wt % of carbon (C), an amount of 0.1 to 0.4 wt % of silicon (Si), an amount of 1.2 to 2.0 wt % of manganese (Mn), an amount greater than 0 but not greater than 0.020 wt % of phosphorus (P), an amount greater than 0 but not greater than 0.003 wt % of sulfur (S), an amount of 0.1 to 0.5 wt % of chromium (Cr), an amount of 0.0015 to 0.0040 wt % of boron (B), an amount of 0.025 to 0.05 wt % of titanium (Ti), and the balance of iron (Fe) and unavoidable impurities, all the wt % based on the total weight of the blank.

For hot rolling, a step of reheating the slab sheet is performed. In the slab reheating step, the slab sheet obtained through a continuous casting process is reheated at a slab reheating temperature (SRT) within a predetermined first temperature range, so that components segregated during the casting process are re-dissolved. When the slab reheating temperature (SRT) is lower than the lower limit of the predetermined first temperature range, problems may arise in that components segregated during the casting process are not sufficiently re-dissolved, making it difficult to achieve a significant effect of homogenizing the alloying elements and a significant effect of dissolving titanium (Ti). A higher slab reheating temperature (SRT) is more advantageous for homogenization. However, when the slab reheating temperature (SRT) is higher than the upper limit of the predetermined first temperature range, the austenite grain size may increase, making it difficult to ensure strength, bake hardenability and aging resistance may also decrease, and the production cost of the steel sheet may increase due to an excessive heating process.

In the hot-rolling step (S210), the reheated slab sheet is finish hot-rolled at a finishing delivery temperature (FDT) within a predetermined second temperature range. In this case, when the finishing delivery temperature (FDT) is lower than the lower limit of the predetermined second temperature range, problems may arise in that it is difficult to ensure the workability of the steel sheet due to the occurrence of mixed grain structures caused by two-phase region rolling, the workability is degraded due to microstructural non-uniformity, and the passage property of the sheet is degraded during hot rolling due to rapid phase changes. A higher finishing delivery temperature (FDT) is more advantageous for homogenization, like the SRT, and the finishing delivery temperature (FDT) is determined according to the SRT and the number of passes. However, when the finishing delivery temperature (FDT) is higher than the upper limit of the predetermined second temperature range, austenite grains may be coarsened, resulting in decreases in bake hardenability and aging resistance.

In the cooling/coiling step (S220), the hot-rolled sheet is cooled to and coiled at a coiling temperature (CT) within a predetermined third temperature range. The coiling temperature influences the re-distribution of carbon (C). When the coiling temperature is lower than the lower limit of the predetermined third temperature range, problems may arise in that the low-temperature phase fraction due to supercooling increases, resulting in an increase in the strength and a significant increase in rolling load during cold rolling, and the ductility rapidly deteriorates. On the other hand, when the coiling temperature is higher than the upper limit of the predetermined third temperature range, a problem may arise in that deterioration in the moldability and strength occurs due to two-phase grain growth or excessive grain growth.

In the cold-rolling step (S230), the coiled sheet is uncoiled, pickled, and then cold-rolled. In this case, the pickling is performed for the purpose of descaling the coiled sheet, that is, the hot-rolled coil manufactured through the hot-rolling process.

The annealing step (S240) is a step of annealing the cold-rolled sheet. In an exemplary embodiment, the annealing includes a step of heating the cold-rolled sheet and cooling the heated cold-rolled sheet at a predetermined cooling rate.

Meanwhile, in the hot-stamping step (S130) of FIG. 1 to be described later, the blank to be molded is softened by heating at high temperature, pressed, and then cooled. Thus, since the steel material is softened by heating at a high temperature, it may be easily pressed, and the mechanical strength of the steel material is increased by quenching with cooling after molding. However, since the steel material is heated at a high temperature of 800° C. or higher, oxides (scales) are generated by oxidation of iron (Fe) on the surface of the steel material. Hence, in an exemplary embodiment of the present invention, a predetermined coating may be formed on the cold-rolled steel sheet after the annealing. Specifically, an aluminum (Al)-based metal coating, for example, an aluminum (Al)-silicon (Si)-based coating, which has a higher melting point than an organic coating or a zinc (Zn)-based coating, may be formed. The aluminum (Al)-silicon (Si)-coated cold-rolled steel sheet may be prevented from corrosion, and the formation of scales on the surface of the hot steel sheet during movement to the press may be prevented. Specifically, a manganese boron steel sheet having 100 to 180 g/m² of an Al—Si coating on both surfaces thereof is used. As described above, the composition of the base layer includes an amount of 0.28 to 0.38 wt % of carbon (C), an amount of 0.1 to 0.4 wt % of silicon (Si), an amount of 1.2 to 2.0 wt % of manganese (Mn), an amount greater than 0 but not greater than 0.020 wt % of phosphorus (P), an amount greater than 0 but not greater than 0.003 wt % of sulfur (S), an amount of 0.1 to 0.5 wt % of chromium (Cr), an amount of 0.0015 to 0.0040 wt % of boron (B), an amount of 0.025 to 0.05 wt % of titanium (Ti), and the balance of iron (Fe), all the wt % based on the total weight of the composition.

Step (S120) of Heating Blank

Figure 3:
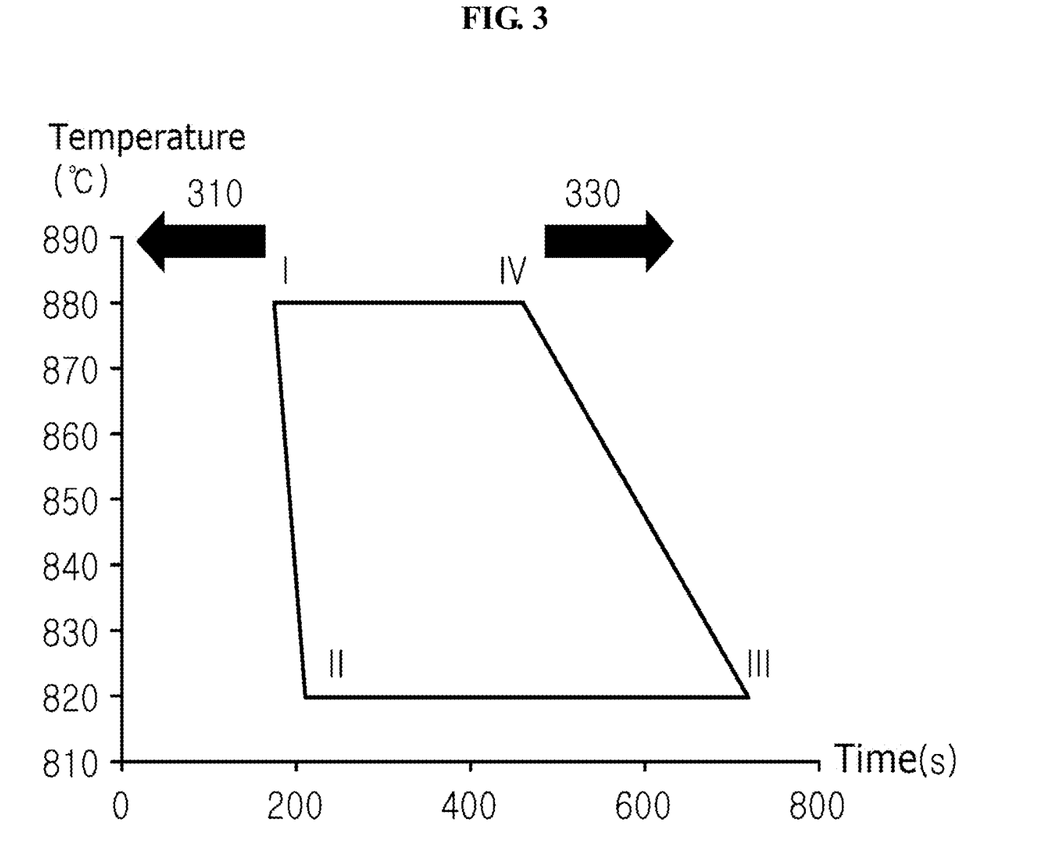
FIG. 3 is a view showing the time and temperature of heating a blank in the method for manufacturing a hot-stamped part according to an exemplary embodiment of the present invention.

FIG. 3 is a view showing the time and temperature of heating the blank in the method for manufacturing a hot-stamped part according to an exemplary embodiment of the present invention.

Referring to FIG. 3, when the thickness of the blank is 1.2 mm, the blank is heated in a preheated furnace for a time and at a temperature defined by the diagram having heating time-temperature coordinates of I (175 sec, 880° C.), II (210 sec, 820° C.), III (745 sec, 820° C.) and IV (455 sec, 880° C.) as apexes. That is, the time and temperature of heating the blank include the time and temperature corresponding to the inner region and boundary line of the diagram I-II-III-IV. Meanwhile, when the thickness of the blank decreases by 0.1 mm from 1.2 mm, the blank is heated for a time that is decreased by 12 sec from the time defined by the diagram I-II-III-IV. Accordingly, the diagram having heating time-temperature coordinates as apexes may move in the direction of a first arrow 310. In addition, when the thickness of the blank increases by 0.1 mm from 1.2 mm, the blank is heated for a time that is increased by 12 sec from the time defined by the diagram I-II-III-IV. Accordingly, the diagram having heating time-temperature coordinates as apexes may move in the direction of a second arrow 330.

Figure 4:
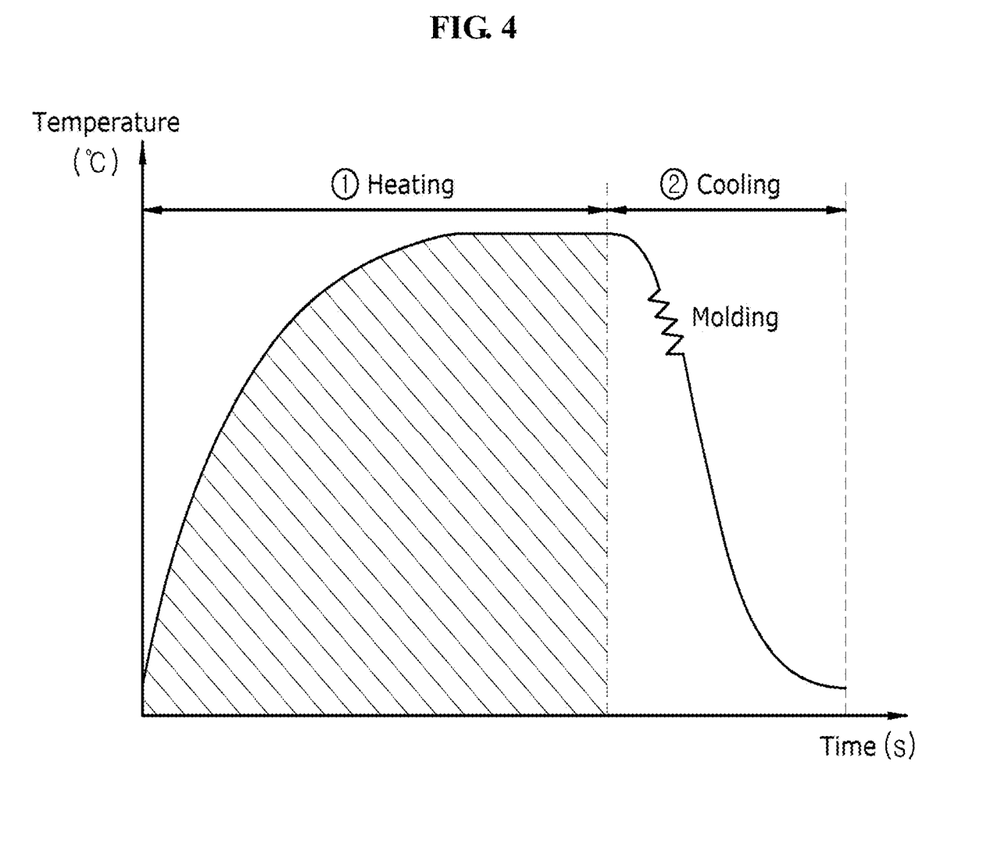
FIG. 4 is a time-dependent temperature graph showing steps of heating a blank, forming a molded body by hot-stamping the heated blank in a press mold, and cooling the molded body, in the method for manufacturing a hot-stamped part according to an exemplary embodiment of the present invention.

FIG. 4 is a time-dependent temperature graph showing steps of heating a blank, forming a molded body by hot-stamping the heated blank in a press mold, and cooling the molded body, in the method for manufacturing a hot-stamped part according to the embodiment of the present invention. '①heating' corresponds to a step of heating the blank before hot stamping, and '②cooling' corresponds to a step of molding the heated blank by hot stamping and cooling the molded body.

Referring to FIG. 4, a heating condition for heating the blank may be set to 6.0×10⁵° C.·sec/mm or less per thickness of the blank. That is, although there is no limitation on the heating method and heating rate of the blank, the ratio of the area per blank thickness under the heating curve of FIG. 4 is limited to 6.0×10⁵° C.·s/mm or less. When the blank is heated greater than necessary at a heating rate higher than this value, desirable weldability and hydrogen embrittlement resistance cannot be obtained when the blank is applied to a vehicle body part.

Hot-Stamping Step (S130) and Cooling Step (S140)

The blank heated under the above-described condition is transferred into a press mold. After the blank is molded into a final part shape in the press mold for hot stamping, the resulting molded body is cooled to form a final product. The press mold may include therein a cooling channel through which a refrigerant circulates. The heated blank may be rapidly cooled by circulation of the refrigerant supplied through the cooling channel. In this case, in order to maintain a desired shape while preventing the spring-back phenomenon of the steel material, rapid cooling may be performed while pressing the press mold in a state in which the press mold is closed. In the process of molding and cooling the heated material, the heated material may be cooled to the martensite end temperature at an average cooling rate of at least 10° C./sec. When the cooling rate is lower than the above-described cooling rate, ferrite or bainite may be generated, and thus mechanical properties, for example, a tensile strength of 1,700 MPa or greater, cannot be satisfied.

The application of the above-described composition and process conditions makes it possible to obtain a hot-stamped part (member) having excellent weldability and delayed fracture resistance. The microstructure of the base layer of the hot-stamped part has a full martensite structure, and satisfies a tensile strength of 1,700 MPa or greater and an elongation of 6% or greater.

In the current automobile industry, environmental and fuel economy regulations and safety standards become more stringent. Accordingly, the application rate of ultra-high strength steel and hot-stamped steel has steadily increased. In particular, in the case of hot-stamped steel, including conventional 1.5 G hot-stamped steel, research and development has been conducted to increase toughness and strength. A hot stamping process generally consists of heating, molding, cooling and trimming, and phase transformation and microstructural change of material are used during the process.

The present invention is intended to ensure desired performance by applying a hot stamping process suitable for the changed material composition in order to increase the strength of conventional hot-stamped steel. However, when conventional 1.5 G hot stamping process conditions are applied to the hot-stamped part steel grade (1.8 G hot-stamped steel grade) according to the embodiment of the present invention as described above, various problems arise due to excessive heating. That is, problems occurs in that the austenite grain size (AGS) becomes coarse and non-uniform, resulting in deterioration in mechanical properties, and in that the appearance color changes and the welding performance is degraded, and also in that hydrogen embrittlement sensitivity increases due to an increase in the amount of hydrogen incorporated.

In this regard, the conventional 1.5 G hot stamping process conditions include steps of: ① heating a blank between 20 and 700° C. at an average heating rate of 4 to 12° C./sec; ② when the thickness of the steel sheet is 0.7 to 1.5 mm, heating the blank in a preheated furnace for a time and at a temperature defined by the diagram A-B-C-D having heating time-temperature coordinates of A (3 min, 930° C.), B (6 min, 930° C.), C (13 min, 880° C.) and D (4.5 min, 880° C.) as apexes, and when the thickness of the steel sheet is 1.5 to 3.0 mm, heating the blank in a preheated furnace for a time and at a temperature defined by the diagram E-F-G-H having heating time-temperature coordinates of E (4 min, 940° C.), F (8 min, 940° C.), G (13 min, 900° C.) and H (6.5 min, 900° C.) as apexes; and ③ cooling the blank to 400° C. at an average cooling rate of at least 30° C./sec.

On the contrary, when the hot-stamped part composition and process conditions according to the embodiment of the present invention are applied, it is possible to realize a hot-stamped part having excellent weldability and delayed fracture resistance and having high tensile strength and a manufacturing method thereof.

For example, according to an exemplary embodiment of the present invention, the final part obtained through the hot-stamping process has an average prior-austenite grain size (PAGS) of 25 μm or less so as to ensure delayed fracture resistance, and exhibits mechanical properties including a tensile strength (TS) of 1,700 MPa or greater, a yield strength (YS) of 1,200 MPa or greater, and an elongation (El) of 6% or greater. Thus, the final part may overcome the problem that the mechanical properties deteriorate due to the coarsening and non-uniformity of the austenite grain size (AGS).

In addition, according to an exemplary embodiment of the present invention, the visually observed color of the final part obtained through the hot-stamping process is not reddish. This indicates that the iron (Fe) in the base layer is prevented from being excessively diffused into the coating layer due to unnecessary heating. In addition, the weldability of the final part may be ensured by controlling the fraction of the Fe—Al—Si-based intermetallic compound layer in the coating layer to less than 40%. Thus, the final part may overcome the problems that the appearance color thereof changes and the welding performance deteriorates.

In addition, according to an exemplary embodiment of the present invention, it was confirmed that no fracture occurred within 100 hours when the delayed fracture resistance of the final part obtained through the hot-stamping process was evaluated by a 4-point bending test. Thus, the final part may overcome the problem that the hydrogen embrittlement sensitivity thereof increases due to an increase in the amount of hydrogen incorporated.

EXPERIMENTAL EXAMPLES

Hereinafter, the configuration and effect of the present invention will be described in more detail with reference to experimental examples. However, these experimental examples are presented as preferred examples of the present invention and cannot be construed as limiting the scope of the present invention in any sense. In addition, since the contents that are not described herein can be sufficiently and technically inferred by any person skilled in the art, the description thereof will be omitted.

TABLE 1

| | Component (wt %) | | | | | | | | | |
|---|---|---|---|---|---|---|---|---|---|---|
| | C | Si | Mn | P | S | Cr | Ni | Ti | Nb | B | Mo |
| Component system 1 | 0.3 | 0.2 | 1.4 | 0.01 | 0.001 | 0.2 | — | 0.03 | — | 0.002 | — |
| Component system 2 | 0.3 | 0.5 | 0.6 | 0.01 | 0.001 | 0.3 | 0.4 | 0.015 | 0.05 | 0.002 | 0.2 |

TABLE 2

| | Material | | Hot-stamping heating conditions | |
|---|---|---|---|---|
| | Composition | Thickness (mm) | Heating temperature (° C.) | Heating time (sec) |
| Example 1 | Component system 1 | 1.2 | 830 | 240 |
| Example 2 | Component system 1 | 1.2 | 830 | 600 |
| Example 3 | Component system 1 | 1.2 | 850 | 300 |
| Example 4 | Component system 1 | 1.2 | 870 | 180 |
| Example 5 | Component system 1 | 1.2 | 870 | 360 |

TABLE 2-continued

| | Material | | Hot-stamping heating conditions | |
|---|---|---|---|---|
| | Composition | Thickness (mm) | Heating temperature (° C.) | Heating time (sec) |
| Comparative Example 1 | Component system 1 | 1.2 | 850 | 180 |
| Comparative Example 2 | Component system 1 | 1.2 | 800 | 600 |
| Comparative Example 3 | Component system 1 | 1.2 | 900 | 480 |
| Comparative Example 4 | Component system 1 | 1.2 | 850 | 1,200 |
| Example 6 | Component system 1 | 1.0 | 850 | 360 |
| Example 7 | Component system 1 | 1.8 | 850 | 300 |
| Comparative Example 5 | Component system 2 | 1.2 | 850 | 180 |
| Comparative Example 6 | Component system 2 | 1.2 | 900 | 300 |
| Comparative Example 7 | Component system 2 | 1.2 | 930 | 600 |

Table 1 above shows the component system compositions according to the experimental examples of the present invention. Referring to Table 1 above, component system 1 satisfies a composition including an amount of 0.28 to 0.38 wt % of carbon (C), an amount of 0.1 to 0.4 wt % of silicon (Si), an amount of 1.2 to 2.0 wt % of manganese (Mn), an amount greater than 0 but not greater than 0.020 wt % of phosphorus (P), an amount greater than 0 but not greater than 0.003 wt % of sulfur (S), an amount of 0.1 to 0.5 wt % of chromium (Cr), an amount of 0.0015 to 0.0040 wt % of boron (B), an amount of 0.025 to 0.05 wt % of titanium (Ti), and the balance of iron (Fe). On the other hand, component system 2 does not satisfy a composition including an amount of 0.1 to 0.4 wt % of silicon (Si) and an amount of 1.2 to 2.0 wt % of manganese (Mn), and further contains nickel (Ni), niobium (Nb) and molybdenum (Mo), unlike component system 1.

Table 2 above shows the steel material compositions of hot-stamped parts and hot-stamping heating conditions according to the experimental examples of the present invention.

Referring to Table 2 above and FIG. 3, each of Examples 1 to 7 has the composition of component system 1 satisfying a composition including an amount of 0.28 to 0.38 wt % of carbon (C), an amount of 0.1 to 0.4 wt % of silicon (Si), an amount of 1.2 to 2.0 wt % of manganese (Mn), an amount greater than 0 but not greater than 0.020 wt % of phosphorus (P), an amount greater than 0 but not greater than 0.003 wt % of sulfur (S), an amount of 0.1 to 0.5 wt % of chromium (Cr), an amount of 0.0015 to 0.0040 wt % of boron (B), an amount of 0.025 to 0.05 wt % of titanium (Ti), and the balance of iron (Fe). In addition, each of Examples 1 to 5 corresponds to the case in which the thickness of a blank as a hot-stamping heating condition is 1.2 mm. In Examples 1 to 5, the blank is heated in a preheated furnace for a time and at a temperature defined by the diagram having heating time-temperature coordinates of I (175 sec, 880° C.), II (210 sec, 820° C.), III (745 sec, 820° C.) and IV (455 sec, 880° C.) as apexes.

Example 6 corresponds to the case in which the thickness of a blank as a hot-stamping heating condition is 1.0 mm. In Example 6, when the thickness of the blank decreases by 0.1 mm from 1.2 mm, the blank is heated for a time that is decreased by 12 seconds from the time defined by the diagram I-II-III-IV. That is, hot-stamping heating conditions are determined by the diagram having heating time-temperature coordinates of I (151 sec, 880° C.), II (186 sec, 820° C.), III (721 sec, 820° C.) and IV (431 sec, 880° C.) as apexes. Example 7 corresponds to the case in which the thickness of a blank is 1.8 mm. In Example 7, when the thickness of the blank increases by 0.1 mm from 1.2 mm, the blank is heated for a time that is increased by 12 seconds from the time defined by the diagram I-II-III-IV. That is, hot-stamping heating conditions are determined by the diagram having heating time-temperature coordinates of I (247 sec, 880° C.), II (282 sec, 820° C.), III (817 sec, 820° C.) and IV (527 sec, 880° C.) as apexes.

Unlike these Examples, in each of Comparative Examples 1 to 4, when the thickness of a blank as a hot-stamping heating condition is 1.2 mm, the blank is not heated in a preheated furnace for a time and at a temperature defined by the diagram having heating time-temperature coordinates of I (175 sec, 880° C.), II (210 sec, 820° C.), III (745 sec, 820° C.) and IV (455 sec, 880° C.) as apexes.

Each of the compositions of Comparative Examples 5 to 7 does not satisfy a composition including an amount of 0.1 to 0.4 wt % of silicon (Si) and an amount of 1.2 to 2.0 wt % of manganese (Mn), and further contain nickel (Ni), niobium (Nb) and molybdenum (Mo), unlike component system 1. When the thickness of a blank as a hot-stamping heating condition is 1.2 mm, each of Comparative Examples 5 to 7 does not satisfy the conditions under which the blank is heated in a preheated furnace for a time and at a temperature defined by the diagram I-having heating time-temperature coordinates of I (175 sec, 880° C.), II (210 sec, 820° C.), III (745 sec, 820° C.) and IV (455 sec, 880° C.) as apexes.

TABLE 3

| | Mechanical properties and microstructure | | | | Application performance | |
| --- | --- | --- | --- | --- | --- | --- |
| | Yield strength (MPa) | Tensile strength (MPa) | Elongation (%) | Microstructure | PAGS (μm) | Results of delayed fracture test | Fraction (%) of Fe—Al—Si-based intermetallic compound layer in coating layer |
| Example 1 | 1,271 | 1,797 | 6.3 | Full martensite | 10.4 | Unfractured | About 11 |
| Example 2 | 1,293 | 1,841 | 6.2 | Full martensite | 12.2 | Unfractured | About 13 |
| Example 3 | 1,288 | 1,823 | 6.4 | Full martensite | 11.0 | Unfractured | About 21 |
| Example 4 | 1,263 | 1,811 | 6.4 | Full martensite | 17.3 | Unfractured | About 15 |
| Example 5 | 1,313 | 1,896 | 6.1 | Full martensite | 19.3 | Unfractured | About 28 |
| Comparative Example 1 | 1,092 | 1,689 | 6.1 | Ferrite + martensite | — | — | — |
| Comparative Example 2 | 1,108 | 1,502 | 4.4 | Ferrite + martensite | — | — | — |
| Comparative Example 3 | 1,297 | 1,839 | 6.7 | Full martensite | 26.2 | Fractured | About 42 |
| Comparative Example 4 | 1,301 | 1,813 | 6.2 | Full martensite | 13.8 | Fractured | About 48 |
| Example 6 | 1,267 | 1,855 | 6.3 | Full martensite | 13.6 | Unfractured | About 17 |
| Example 7 | 1,249 | 1,836 | 6.5 | Full martensite | 12.3 | Unfractured | About 12 |
| Comparative Example 5 | 747 | 1,469 | 7.9 | Ferrite + martensite | — | — | — |
| Comparative Example 6 | 1,274 | 1,766 | 6.5 | Full martensite | 10.8 | Unfractured | About 41 |
| Comparative Example 7 | 1,287 | 1,788 | 6.3 | Full martensite | 13.1 | Unfractured | About 51 |

Table 3 below shows the mechanical properties, microstructures and application performance of the hot-stamped parts according to the experimental examples of the present invention.

Referring to FIG. 3, it can be confirmed that each of Examples 1 to 7 satisfy all mechanical properties, including a tensile strength (TS) of 1,700 MPa or greater, a yield strength (YS) of 1,200 MPa or greater, and an elongation (El) of 6% or greater, the microstructure thereof is full martensite, the final parts obtained through the hot-stamping process each have an average prior-austenite grain size (PAGS) of 25 μm or less so as to ensure delayed fracture resistance, no fracture occurs in the delayed fracture test, and the fraction of the Fe—Al—Si-based intermetallic compound layer in the coating layer is less than 40%.

On the other hand, it can be confirmed that each of Comparative Examples 1 to 5 does not satisfy mechanical properties, including a tensile strength (TS) of 1,700 MPa or greater and a yield strength (YS) of 1,200 MPa or greater, and the microstructure thereof is not full martensite, but consists of ferrite and martensite. It can be confirmed that Comparative Example 2 does not satisfy mechanical properties, including a tensile strength (TS) of 1,700 MPa or greater, a yield strength (YS) of 1,200 MPa or greater, and an elongation (El) of 6% or greater, and the microstructure thereof is not full martensite, but consists of ferrite and martensite. It can be confirmed that, in Comparative Example 3, the final part obtained through the hot-stamping process has an average prior-austenite grain size (PAGS) of greater than 25 μm, a fracture occurs in the delayed fracture test, and the fraction of the Fe—Al—Si-based intermetallic compound layer in the coating layer is greater than 40%. It can be confirmed that, in Comparative Example 4, a fracture occurs in the delayed fracture test, and the fraction of the Fe—Al—Si-based intermetallic compound layer in the coating layer is greater than 40%. It can be confirmed that, in Comparative Examples 6 and 7, the fraction of the Fe—Al—Si-based intermetallic compound layer in the coating layer is greater than 40%.

Figure 5A:
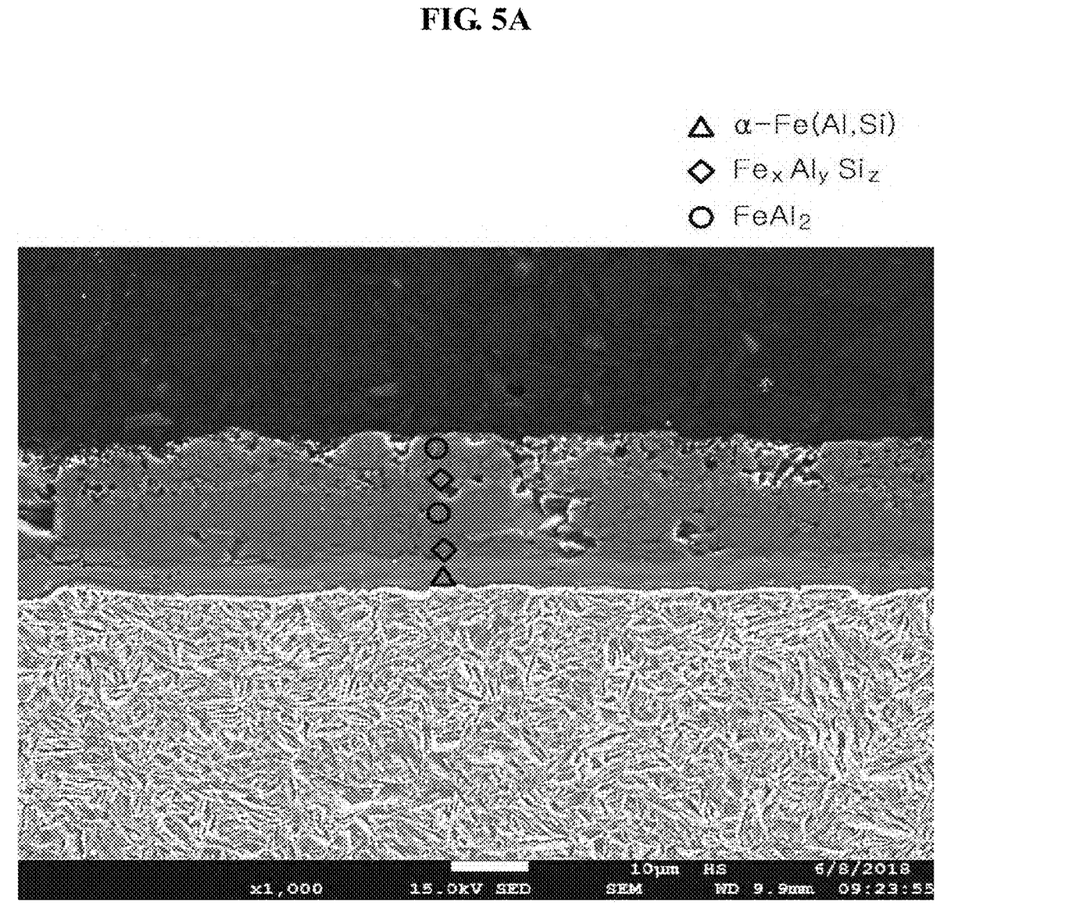
FIGS. 5A and 5B are sectional photographs of specimens used to compare the fraction of a Fe—Al—Si-based intermetallic compound layer in a coating layer in experimental examples of the present invention.
Figure 5B:
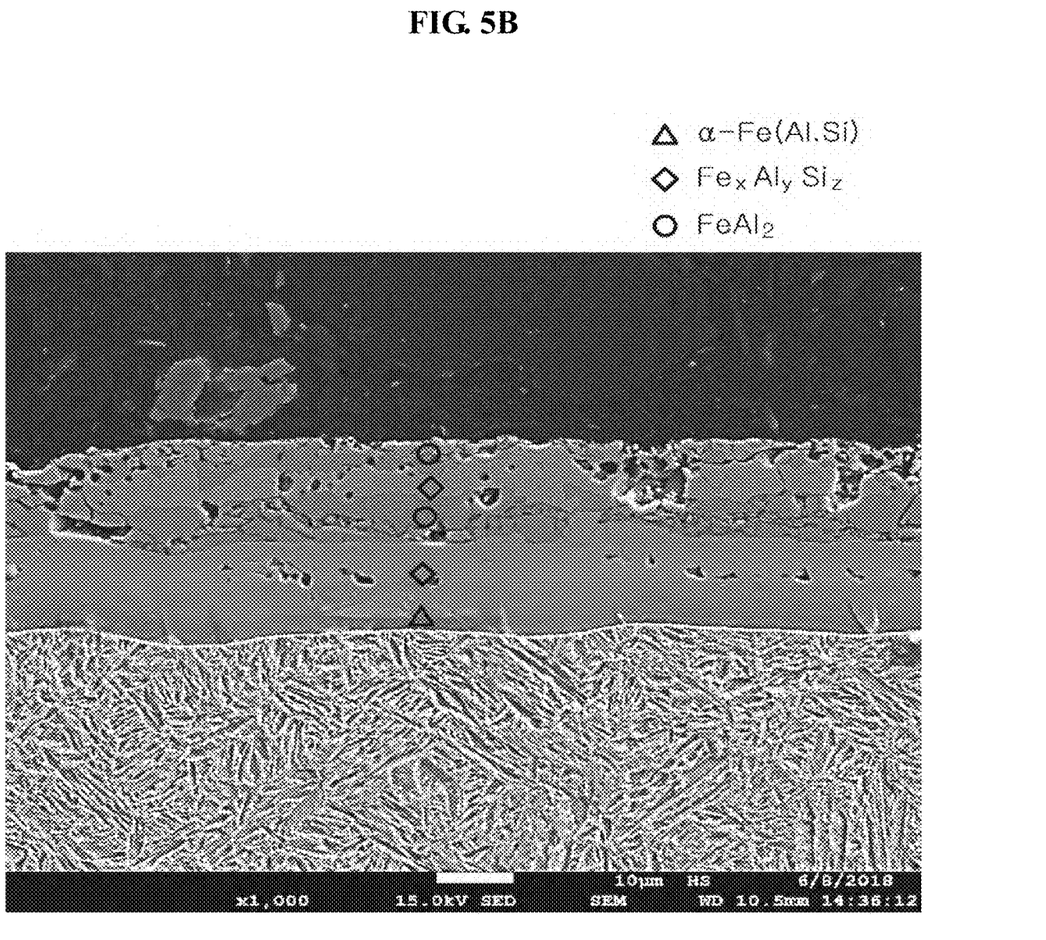

FIG. 5A-5B show cross-sectional photographs of specimens used to compare the fraction of the Fe—Al—Si-based intermetallic compound layer in the coating layer in the experimental examples of the present invention. FIG. 5A is a cross-sectional photograph of a specimen corresponding to Example 3 of Table 3, and FIG. 5B is a cross-sectional photograph of a specimen corresponding to Comparative Example 3 of Table 3.

As shown in FIG. 5A, the cross-section of the coating layer of the final part obtained through the hot-stamping process should have an Fe—Al—Si-based intermetallic compound layer fraction corresponding to less than 40% of the total fraction of the coating layer so as to ensure desirable weldability. It can be confirmed that, when composition system 1 in Table 1 and the process conditions in Table 2 are satisfied, the above-described fraction range may be satisfied. On the other hand, referring to FIG. 5B, when the Fe—Al—Si-based intermetallic compound layer grows thick and exceeds a fraction of 40%, the welding resistance thereof increases, so that the probability of developing spattering or iron thorns increases, resulting in deterioration in weldability.

Figure 6A:
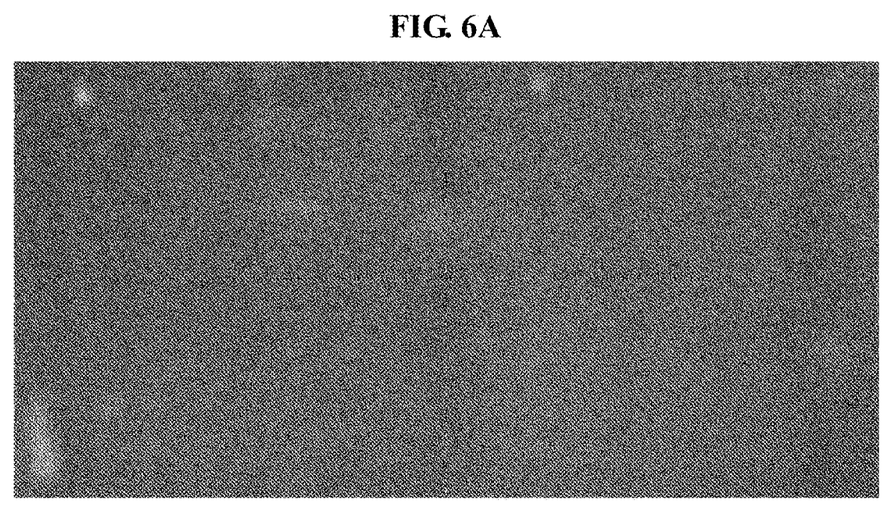
FIGS. 6A and 6B are photographs showing visual observation of final parts obtained through a hot-stamping process according to experimental examples of the present invention.
Figure 6B:
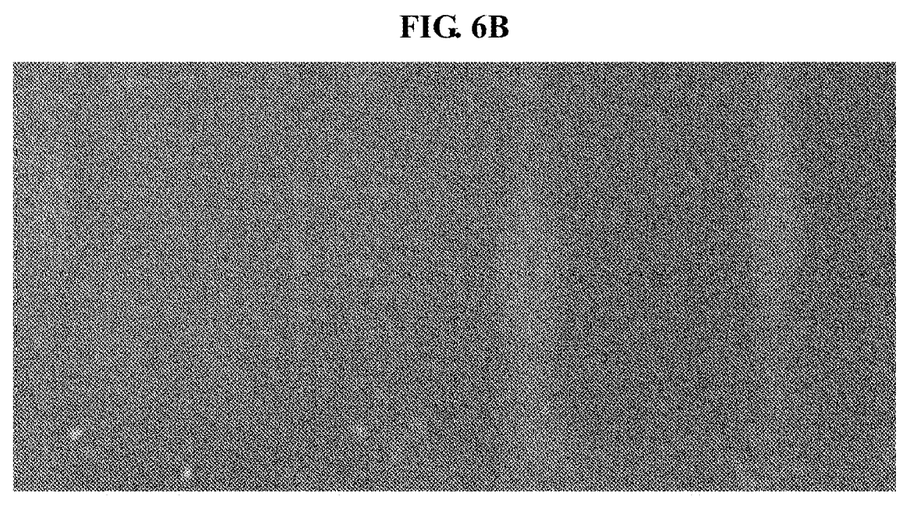

FIG. 6 depicts photographs showing visual observation of the final parts obtained through the hot-stamping process according to the experimental examples of the present invention. FIG. 6A is a cross-sectional photograph of a specimen corresponding to Example 2 of Table 3, and FIG. 6B is a cross-sectional photograph of a specimen corresponding to Comparative Example 6 of Table 3.

As shown in FIG. 6A, the visually observed color of the final part obtained through the hot-stamping process should not be reddish. It can be confirmed that, when composition system 1 in Table 1 and the process conditions in Table 2 are satisfied, the visually observed color is not reddish. That is, in FIG. 6A, the appearance color is bluish. On the other hand, in FIG. 6B, it can be confirmed that the visually observed color is reddish. Although the appearance color is not directly related to the Fe—Al—Si-based intermetallic compound layer in the coating layer, it can be understood that Fe in the base layer was sufficiently diffused into the coating layer due to unnecessary heating, as shown in FIG. 6B. In this case, when the fraction of the Fe—Al—Si-based intermetallic compound layer in the coating layer increases to 40% or greater, weldability deteriorates.

Figure 7A:
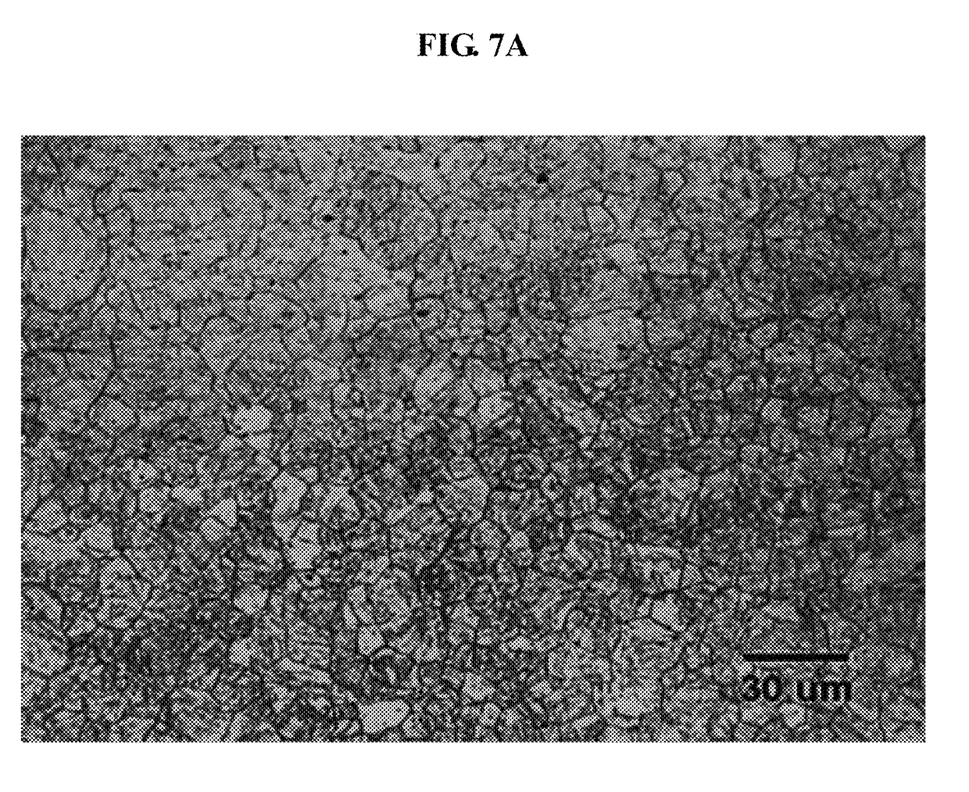
FIGS. 7A and 7B are photographs of the microstructures of final parts obtained through a hot-stamping process according to experimental examples of the present invention.
Figure 7B:
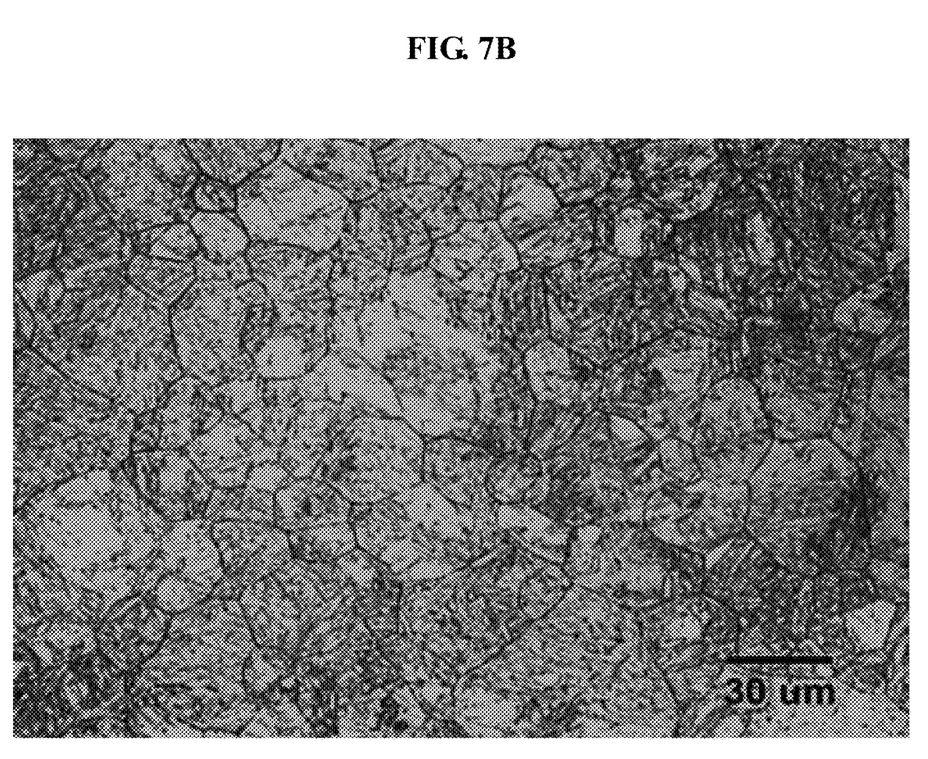

FIGS. 7A-7B show photographs of the microstructures of the final parts obtained through the hot-stamping part according to the experimental examples of the present invention. FIG. 7A is a photograph of the microstructure of a specimen (average PAGS=12.2 μm) corresponding to Example 2 of Table 3, and FIG. 7B is a photograph of the microstructure of a specimen (average PAGS=26.2 μm) corresponding to Comparative Example 3 of Table 3.

As shown in FIG. 7A, the final part obtained through the hot-stamping process should have an average PAGS of 25 μm or less so as to ensure delayed fracture resistance. It can be confirmed that, when composition system 1 in Table 1 and the process conditions in Table 2 are satisfied, the above-described PAGS range can be satisfied. On the other hand, referring to FIG. 7B, it can be confirmed that, as additional heating is performed after austenite phase transformation is completed during the heating process, austenite grain growth occurs, and thus the austenite grains gradually coarsen and become non-uniform. As the austenite grain size is coarse and non-uniform, the delayed fracture resistance of the part decreases after completion of martensite transformation caused by the cooling operation. In an exemplary embodiment of the present invention, it is one of the main objects of the present invention to derive the corresponding performances through a preferable hot-stamping operation without largely depending on elements for grain refinement, such as Nb, Mo, and V.

Although the present invention has been described above with reference to the embodiments of the present invention, various changes or modifications may be made by those skilled in the art. Such changes and modifications can be considered falling within the present invention as long as they do not depart from the scope of the present invention. Therefore, the scope of the present invention should be determined by the claims described below.

What is claimed:

1. A method for manufacturing a hot-stamped part, the method comprising steps of:
    (a) preparing a blank;
    (b) heating the blank;
    (c) forming a molded body by hot-stamping the heated blank in a press mold; and
    (d) forming a hot-stamped part by cooling the molded body,
    wherein step (b) comprises: when a thickness of the blank is 1.2 mm, heating the blank in a preheated furnace for a time and to a temperature defined by one point within a first diagram having heating time-temperature coordinates of I (175 sec, 880° C.), II (210 sec, 820° C.), III (745 sec, 820° C.) and IV (455 sec, 880° C.) as apexes,
    wherein the heating time per changed thickness is constantly changed depending on a change in thickness of the blank with the temperature of the first diagram fixed, and
    the blank in step (a) comprises 0.28 to 0.38 wt % of carbon (C), 0.1 to 0.4 wt % of silicon (Si), 1.2 to 2.0 wt % of manganese (Mn), more than 0 but not more than 0.020 wt % of phosphorus (P), more than 0 but not more than 0.003 wt % of sulfur (S), 0.1 to 0.5 wt % of chromium (Cr), 0.0015 to 0.0040 wt % of boron (B), 0.025 to 0.05 wt % of titanium (Ti), and the balance of iron (Fe) and unavoidable impurities, the hot-stamped part formed after step (d) comprises a base layer, a microstructure of the base layer is full martensite, and the hot-stamped part further comprises an Al—Si coating layer on the base layer, wherein a fraction of a Fe—Al—Si-based intermetallic compound layer in the coating layer is less than 40%, and a final part obtained through the hot-stamping process has an average prior-austenite grain size (PAGS) of 25 μm or less, a tensile strength (TS) of 1,700 MPa or more, a yield strength (YS) of 1,100 MPa or more, and an elongation (El) of 5% or more.

2. The method of claim 1, wherein step (b) comprises: when if the thickness of the blank decreases by 0.1 mm from 1.2 mm, heating the blank for a time that is decreased by 12 sec from the time defined by the first diagram; and when the thickness of the blank increases by 0.1 mm from 1.2 mm, heating the blank for a time that is increased by 12 sec from the time defined by the first diagram.

3. The method of claim 2, wherein a heating condition for heating the blank is set to $60 \times 10^{5}$° C.·sec/mm or less per thickness of the blank.

4. The method of claim 3, wherein the cooling of the molded body in step (d) is performed at a rate of at least 10° C./sec.

5. A hot-stamped part manufactured by the method of claim 1, comprising, as a base layer, a steel material having a composition comprising 0.28 to 0.38 wt % of carbon (C), 0.1 to 0.4 wt % of silicon (Si), 1.2 to 2.0 wt % of manganese (Mn), more than 0 but not more than 0.020 wt % of phosphorus (P), more than 0 but not more than 0.003 wt % of sulfur (S), 0.1 to 0.5 wt % of chromium (Cr), 0.0015 to 0.0040 wt % of boron (B), 0.025 to 0.05 wt % of titanium (Ti), and the balance of iron (Fe) and unavoidable impurities, wherein a microstructure of the base layer is full martensite, and further comprising an Al—Si coating layer on the base layer, wherein a fraction of a Fe—Al—Si-based intermetallic compound layer in the coating layer is less than 40%, and the hot-stamped part has an average prior-austenite grain size (PAGS) of 25 μm or less, a tensile strength (TS) of 1,700 MPa or more, a yield strength (YS) of 1,100 MPa or more, and an elongation (El) of 5% or more.

* * * * *